(12) United States Patent
Seok et al.

(10) Patent No.: US 11,768,702 B2
(45) Date of Patent: Sep. 26, 2023

(54) ELECTRONIC DEVICE FOR SCHEDULING BASED ON HETEROGENEOUS MULTI-PROCESSOR AND OPERATING METHOD THEREOF

(71) Applicant: Samsung Electronics Co., Ltd., Suwon-si (KR)

(72) Inventors: Hyunchul Seok, Suwon-si (KR); Choonghoon Park, Suwon-si (KR); Byungsoo Kwon, Suwon-si (KR); Bumgyu Park, Suwon-si (KR); Jonglae Park, Suwon-si (KR); Junhwa Seo, Suwon-si (KR); Youngcheol Shin, Suwon-si (KR); Youngtae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 17/112,008

(22) Filed: Dec. 4, 2020

(65) Prior Publication Data
US 2021/0248003 A1 Aug. 12, 2021

(30) Foreign Application Priority Data
Feb. 7, 2020 (KR) .......................... 10-2020-0015232

(51) Int. Cl.
*G06F 9/48* (2006.01)
*G06F 9/38* (2018.01)
*G06F 9/50* (2006.01)
*G06F 9/54* (2006.01)

(52) U.S. Cl.
CPC .......... *G06F 9/4881* (2013.01); *G06F 9/3836* (2013.01); *G06F 9/3877* (2013.01); *G06F 9/50* (2013.01); *G06F 9/505* (2013.01); *G06F 9/5005* (2013.01); *G06F 9/5027* (2013.01);
(Continued)

(58) Field of Classification Search
None
See application file for complete search history.

(56) References Cited

U.S. PATENT DOCUMENTS

| 2015/0121387 A1 | 4/2015 | Chang et al. |
| 2015/0261579 A1 | 9/2015 | Davis et al. |
| 2016/0092274 A1 | 3/2016 | Singh et al. |

(Continued)

FOREIGN PATENT DOCUMENTS

| CN | 109298919 B | 9/2021 |
| JP | 5345990 B2 | 8/2013 |

(Continued)

OTHER PUBLICATIONS

International Search Report dated Mar. 2, 2021, issued in International Application No. PCT/KR2020/017972.

*Primary Examiner* — Qing Yuan Wu
(74) *Attorney, Agent, or Firm* — Jefferson IP Law, LLP (57) ABSTRACT

An apparatus and a method for scheduling a task in an electronic device including a heterogeneous multi-processor are provided. The electronic device includes a memory and a processor operatively connected to the memory and including a plurality of heterogeneous cores. The processor may be configured to identify, when a task to be scheduled occurs, a scheduling group having the task among a plurality of predefined scheduling groups, and to perform scheduling for the task, based on the identified scheduling group having the task and a priority of the task.

14 Claims, 8 Drawing Sheets

(52) U.S. Cl.
CPC ............ *G06F 9/5033* (2013.01); *G06F 9/541* (2013.01); *G06F 9/4893* (2013.01)

(56) References Cited

U.S. PATENT DOCUMENTS

| | | |
|---|---|---|
| 2016/0239346 A1 | 8/2016 | Kipp |
| 2018/0004578 A1 | 1/2018 | You et al. |
| 2018/0032376 A1 | 2/2018 | Udava et al. |
| 2019/0370060 A1 | 12/2019 | Kang et al. |

FOREIGN PATENT DOCUMENTS

| | | |
|---|---|---|
| JP | 5573180 B2 | 7/2014 |
| KR | 10-2019-0138365 A | 12/2019 |

| TABLE | | TASK PRIORITY | | |
|---|---|---|---|---|
| | | PRIORITY <= 1ST REF. (1ST SUBGROUP) | 1ST REF. < PRIORITY < 2ND REF. (2ND SUBGROUP) | PRIORITY >= 2ND REF. (3RD SUBGROUP) |
| SCHEDULING GROUP | 1ST SCHEDULING GROUP (500) | CORE 1 | CORE 1, CORE 0 | CORE 0 |
| | 2ND SCHEDULING GROUP (510) | CORE 7, CORE 6 | CORE 5, CORE 4, CORE 2 | CORE 1, CORE 0 |
| | 3RD SCHEDULING GROUP (520) | CORE 7, CORE 6 | CORE 6, CORE 5, CORE 4, CORE 3 | CORE 3, CORE 2, CORE 1, CORE 0 |

FIG. 7

ELECTRONIC DEVICE FOR SCHEDULING BASED ON HETEROGENEOUS MULTI-PROCESSOR AND OPERATING METHOD THEREOF

CROSS-REFERENCE TO RELATED APPLICATION(S)

This application is based on and claims priority under 35 U.S.C. § 119(a) of a Korean patent application number 10-2020-0015232, filed on Feb. 7, 2020, in the Korean Intellectual Property Office, the disclosure of which is incorporated by reference herein in its entirety.

BACKGROUND

1. Field

The disclosure relates to an apparatus and a method for scheduling a task in an electronic device including a heterogeneous multi-processor.

2. Description of Related Art

With the development of information and communication technology and semiconductor technology, electronic devices that support various multimedia services are increasing in use. As data throughput increases to provide such multimedia services, the electronic devices require a processor having a relatively high processing speed and/or a memory having a large storage capacity.

Some electronic devices tend to use a heterogeneous multi-processor to reduce power consumption while processing data relatively quickly.

The above information is presented as background information only to assist with an understanding of the disclosure. No determination has been made, and no assertion is made, as to whether any of the above might be applicable as prior art with regard to the disclosure.

SUMMARY

The heterogeneous multi-processor is composed of multiple cores having different sizes and/or different processing capabilities (e.g., a processing speed). For example, the heterogeneous multi-processor may include at least one first core (e.g., a power central processing unit (CPU)) having a lower processing speed and lower power consumption, and at least one second core (e.g., a performance CPU) having a higher processing speed and higher power consumption.

Therefore, the electronic device including the heterogeneous multi-processor needs a scheme for determining which core will be allocated as a core for processing a task related to an application program so as to realize efficient execution of the application program. Accordingly, a need exists for an apparatus and a method for scheduling a task in an electronic device including a heterogeneous multi-processor.

Aspects of the disclosure are to address at least the above-mentioned problems and/or disadvantages and to provide at least the advantages described below. Accordingly, an aspect of the disclosure is to provide an apparatus and a method for scheduling a task in an electronic device including a heterogeneous multi-processor.

Additional aspects will be set forth in part in the description which follows and, in part, will be apparent from the description, or may be learned by practice of the presented embodiments.

In accordance with an aspect of the disclosure, an electronic device is provided. The electronic device includes a memory and a processor operatively connected to the memory and including a plurality of heterogeneous cores. The processor may be configured to identify, when a task to be scheduled occurs, a scheduling group having the task among a plurality of predefined scheduling groups, and to perform scheduling for the task, based on the identified scheduling group having the task and a priority of the task.

In accordance with another aspect of the disclosure, a method of operating an electronic device is provided. The method includes identifying, when a task to be scheduled occurs, a scheduling group having the task among a plurality of predefined scheduling groups, and performing scheduling for the task in a processor including a plurality of heterogeneous cores, based on the identified scheduling group having the task and a priority of the task.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
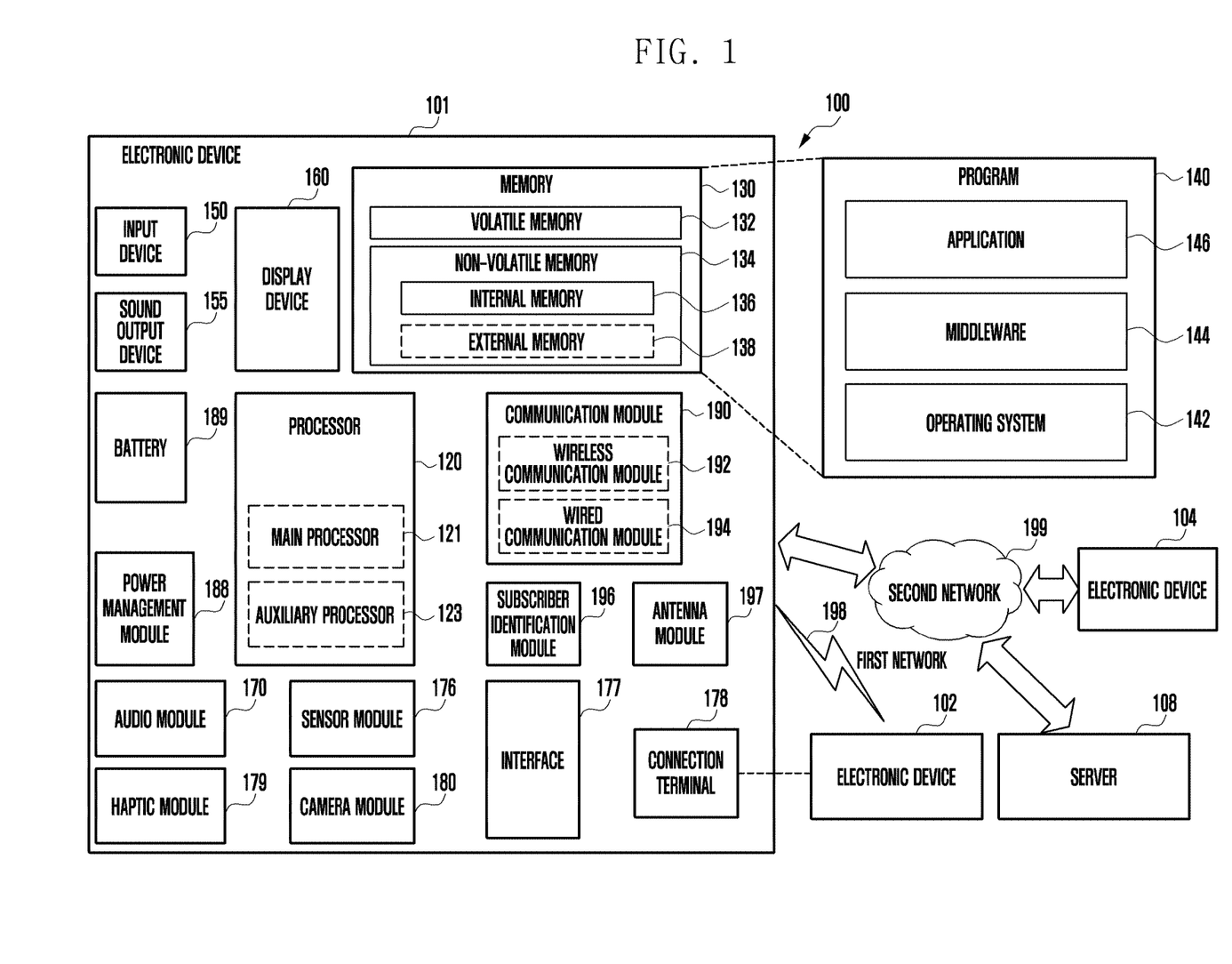
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
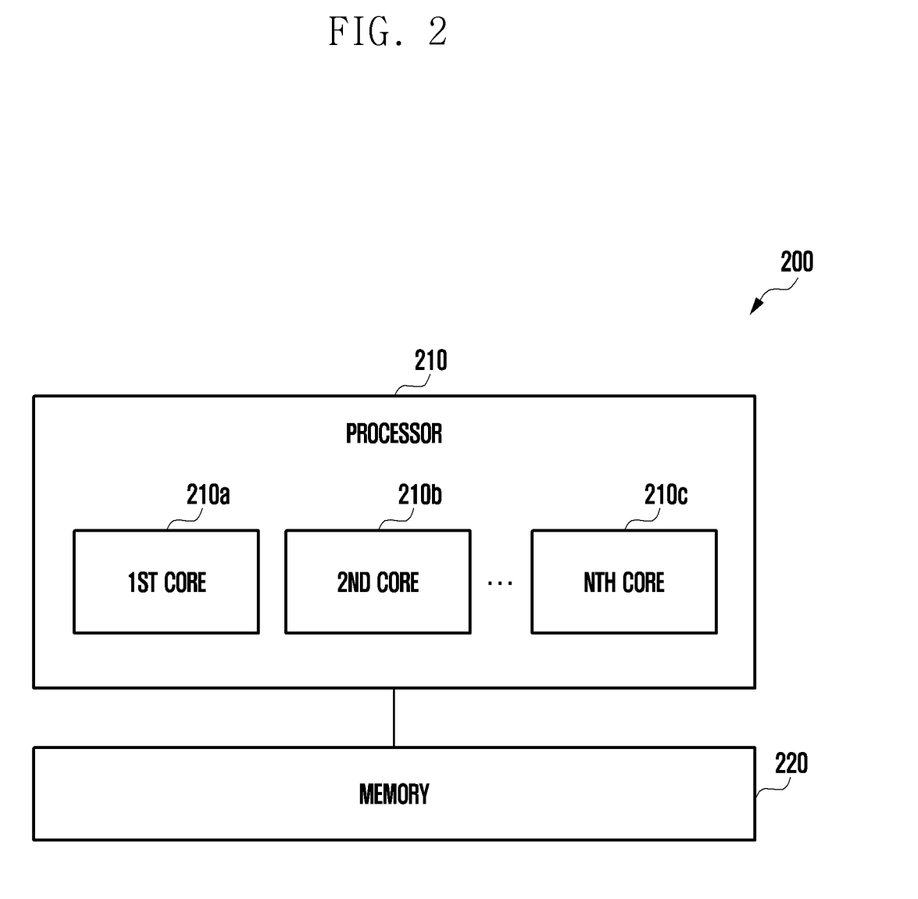
FIG. 2 is a block diagram illustrating an electronic device including a heterogeneous multi-processor according to an embodiment of the disclosure.

FIG. 2 is a block diagram illustrating an electronic device 200 including a heterogeneous multi-processor according to an embodiment of the disclosure. The electronic device 200 of FIG. 2 may be similar, at least in part, to the electronic device 100 of FIG. 1, or may include any other embodiment of the electronic device.

Referring to FIG. 2, according to various embodiments of the disclosure, the electronic device 200 may include a processor (e.g., including processing circuitry) 210 and/or a memory 220. According to an embodiment of the disclosure, the processor 210 may be identical with or be included in the processor 120 (e.g., an application processor) of FIG. 1. The memory 307 may be identical with or be included in the memory 130 of FIG. 1.

According to various embodiments of the disclosure, the processor 210 may include a first core 210a, a second core 210b, and/or an nth core 210c, which have different sizes and/or different processing capabilities (e.g., a processing speed). In the disclosure, 'n' denotes the number of cores included in the processor 210 and may include a positive integer equal to or greater than 3. According to an embodiment of the disclosure, the first core 210a, the second core 210b, and/or the nth core 210c may support an independent operation and/or power control. According to an embodiment of the disclosure, the power voltages of the first core 210a, the second core 210b, and/or the nth core 210c may be provided at the same level or different levels. For example, while the first core 210a is driven with power, the second core 210b and/or the nth core 210c may be managed in a standby state, an idle state, or a plug-out state. According to an embodiment of the disclosure, the clocks of the first core 210a, the second core 210b, and/or the nth core 210c may be managed at the same frequency or different frequencies. According to an embodiment of the disclosure, the processor 210 may manage the first core 210a, the second core 210b, and/or the nth core 210c as a plurality of clusters based on the processing speed and/or power consumption.

According to various embodiments of the disclosure, when a task to be scheduled occurs, the processor 210 may select a core (e.g., the first core 210a) for performing task scheduling from among the first core 210a, the second core 210b, and the nth core 210c. According to an embodiment of the disclosure, the processor 210 may select a core (e.g., the first core 210a) for performing task scheduling, based on at least one of the execution state (e.g., active or not) of each core, the load of each core, the processing performance of each core, the power consumption of each core, or the battery state (e.g., a remaining battery capacity) of the electronic device 200. According to an embodiment of the disclosure, the processor 210 may select, as a core (e.g., the first core 210a) for performing task scheduling, any one of active cores among the first core 210a, the second core 210b, and the nth core 210c. For example, the core for performing task scheduling may be assigned a scheduling task to process the task scheduling.

According to various embodiments of the disclosure, the processor 210 (e.g., the first core 210a) may schedule a core 210a, 210b, or 210c for processing a task, based on a scheduling group with the task and the priority of the task. For example, a task may refer to a minimum unit for scheduling in the processor 210. For example, a task may include at least one thread and/or process processed by the processor 210. For example, a process indicates a state in which an application program of the electronic device 200 is being executed, and one process may include a plurality of threads.

According to an embodiment of the disclosure, when a task to be scheduled occurs, the processor 210 (e.g., the first core 210a) may identify a scheduling group having the task among a plurality of predefined scheduling groups. For example, the processor 210 (e.g., the first core 210a) may identify a scheduling group having the task, based on at least one of the execution state of an application program including the task, the importance of the task, or the type of the task. For example, the execution state of an application program may include information related to whether execution information (e.g., a graphic user interface) of the application program is displayed on the uppermost portion of a display (e.g., the display device 160 in FIG. 1) (that is, whether the application program is running in the foreground), or information related to whether the application program is running in the background. For example, the type of the task may include information related to whether the task is a task of a framework layer required to execute an application program. For example, the importance of the task may be set during a programming process of an application program or set based on the type of the task.

According to an embodiment of the disclosure, the processor 210 (e.g., the first core 210a) may identify a subgroup having the task among a plurality of subgroups included in the scheduling group of the task, based on the priority of the task. For example, the priority of the task may be set during a programming process of an application program related to the task or set based on the type of the task. For example, a task related to a main thread and/or a render thread may be given a higher priority than the other tasks. The higher the priority, the higher the importance of the task may be.

According to an embodiment of the disclosure, the processor 210 (e.g., the first core 210a) may schedule a task, based on a scheduling group and a subgroup having the task. For example, from among the first core 210a, the second core 210b, and the nth core 210c, the processor 210 (e.g., the first core 210a) may identify at least one first candidate core 210a, 210b, and/or 210c available in the scheduling group having the task. For example, from among the at least one first candidate core 210a, 210b, and/or 210c, the processor 210 (e.g., the first core 210a) may identify at least one second candidate core 210a, 210b, and/or 210c available in the subgroup having the task. The processor 210 (e.g., the first core 210a) may select a core 210a, 210b, or 210c for processing the task from among the at least one second candidate core 210a, 210b, and/or 210c and thereby allocate the task to the selected core. For example, in case of using an energy-aware scheduler (EAS), the processor 210 (e.g., the first core 210a) may allocate the task to a core 210a, 210b, or 210c which is predicted to have the smallest energy consumption caused by task allocation from among such candidate core(s) 210a, 210b, and/or 210c. For example, the processor 210 (e.g., the first core 210a) may allocate the task to a core 210a, 210b, or 210c which is predicted to have the best energy efficiency caused by task allocation from among such candidate core(s) 210a, 210b, and/or 210c. For example, the processor 210 (e.g., the first core 210a) may select a core 210a, 210b, or 210c for task allocation, based on the load of such candidate core(s) 210a, 210b, and/or 210c.

According to various embodiments of the disclosure, the processor 210 (e.g., the first core 210a) may adaptively set the subgroup included in the scheduling group. According to an embodiment of the disclosure, the processor 210 (e.g., the first core 210a) may set at least one reference value for classifying subgroups within the scheduling group, based on at least one of the number of tasks included in each subgroup, the number of waiting tasks for core allocation in each subgroup, the execution state of an application related to the task, or a battery state (e.g., remaining battery capacity) of the electronic device 200. For example, the number of tasks included in each subgroup may include the maximum number of tasks included in each subgroup of the scheduling group, or an average of the number of tasks included in the plurality of subgroups. For example, the number of waiting tasks in each subgroup may include the maximum number of waiting tasks included in each subgroup of the scheduling group, or an average of the number of waiting tasks included in the plurality of subgroups.

According to various embodiments of the disclosure, the processor 210 (e.g., the first core 210a) may schedule a core 210a, 210b, or 210c to process the task, based on the priority of the task. According to an embodiment of the disclosure, when a task to be scheduled occurs, the processor 210 (e.g., the first core 210a) may identify a group including the task among a plurality of groups, based on the priority of the task. For example, from among the first core 210a, the second core 210b, and the nth core 210c, the processor 210 (e.g., the first core 210a) may identify at least one candidate core 210a, 210b, and/or 210c available in a group including the task. For example, the processor 210 (e.g., the first core 210a) may select a core 210a, 210b, or 210c for processing the task from among the at least one candidate core 210a, 210b, and/or 210c and thereby allocate the task to the selected core. For example, at least one reference value for classifying a plurality of groups may be adaptively set. For example, the at least one reference value for classifying the plurality of groups may be set, based on at least one of the number of tasks included in each subgroup, the number of waiting tasks for core allocation in each subgroup, the execution state of an application related to the task, or a battery state (e.g., a remaining battery capacity) of the electronic device 200.

According to various embodiments of the disclosure, the memory 220 may store various data used by at least one component (e.g., the processor 210) of the electronic device 200. For example, such data may include at least one of configuration information (e.g., a reference value) of a scheduling group and/or configuration information (e.g., a reference value) of a subgroup.

According to various embodiments of the disclosure, an electronic device (e.g., the electronic device 101 of FIG. 1, or the electronic device 200 of FIG. 2) may comprise a memory (e.g., the memory 220 of FIG. 2); and a processor (e.g., the processor 210 of FIG. 2) operatively connected to the memory and including a plurality of heterogeneous cores, wherein the processor may identify, when a task to be scheduled occurs, a scheduling group having the task among a plurality of predefined scheduling groups, and perform scheduling for the task, based on the identified scheduling group having the task and a priority of the task.

The processor may identify the scheduling group having the task, based on at least one of an execution state of an application program related to the task, an importance of the task, or a type of the task.

The processor may identify, based on a priority of the task, a subgroup having the task among a plurality of subgroups included in the scheduling group having the task, identify one or more cores available in the subgroup having the task among the plurality of heterogeneous cores, and allocate the task to one of the one or more cores.

The processor may identify one or more candidate cores available in the scheduling group having the task among the plurality of heterogeneous cores, and identify the one or more cores available in the subgroup having the task among the one or more candidate cores.

The processor may identify at least one reference value for classifying the plurality of subgroups, and identify the subgroup having the task, based on the at least one reference value.

The processor may set the at least one reference value for classifying the plurality of subgroups, based on at least one of a number of tasks included in each subgroup, a number of waiting tasks for core allocation in each subgroup, an execution state of an application related to a task, or a battery state of the electronic device.

The number of tasks included in each subgroup may include a maximum number of tasks included in each subgroup of the scheduling group having the task, or an average of the number of tasks included in the plurality of subgroups, and the number of waiting tasks in each subgroup may include a maximum number of waiting tasks included in each subgroup of the scheduling group having the task, or an average of the number of waiting tasks included in the plurality of subgroups.

The the processor may allocate the task to one of the one or more cores, based on at least one of an amount of energy required to process the task in each of the one or more cores, an efficiency of the energy, or a load of each core.

The processor may perform the scheduling for the task through a core selected from among the plurality of heterogeneous cores.

The core may be selected based on at least one of an execution state of each core, a load of each core, a processing performance of each core, or a battery state of the electronic device.

Figure 3:
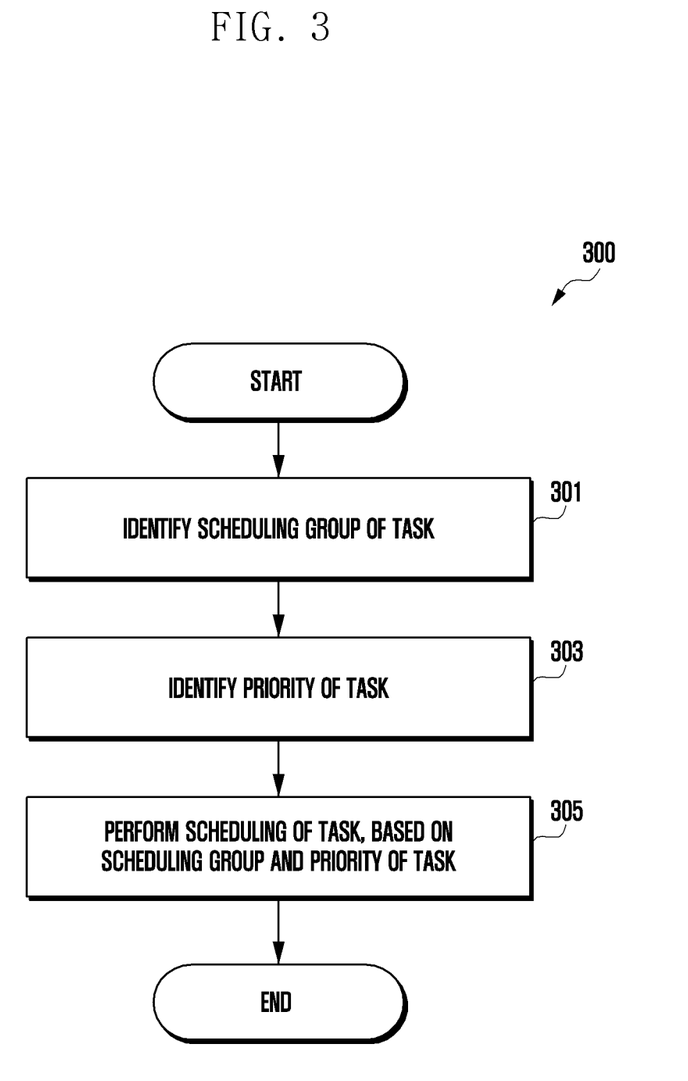
FIG. 3 is a flow diagram illustrating a method for scheduling a task in an electronic device according to an embodiment of the disclosure.

FIG. 3 is a flow diagram 300 illustrating a method for scheduling a task in an electronic device according to an embodiment of the disclosure.

In the following embodiments of the disclosure, respective operations may be sequentially performed, but not necessarily sequentially. For example, the order of such operations may be changed, and at least two operations may be performed in parallel. For example, the electronic device may be the electronic device 101 shown in FIG. 1 or the electronic device 200 shown in FIG. 2.

Referring to FIG. 3, according to various embodiments of the disclosure, the electronic device (especially, the processor 120 in FIG. 1 or the processor 210 in FIG. 2) may identify, at operation 301, a scheduling group having a task to be scheduled from among a plurality of predefined scheduling groups. According to an embodiment of the disclosure, when a task to be scheduled occurs, the processor 210 may acquire configuration information of a scheduling group stored in the memory 220. Then, based on at least one of the execution state of an application program having the task to be scheduled, the importance of the task, or the type of the task, the processor 210 may identify a scheduling group in which the task is included.

According to various embodiments of the disclosure, at operation 303, the electronic device (e.g., the processor 120 or 210) may identify the priority of the task to be scheduled. For example, the priority of the task may be set during a programming process of an application program related to the task or set based on the type of the task.

According to various embodiments of the disclosure, at operation 305, the electronic device (e.g., the processor 120 or 210) may schedule the task, based on a scheduling group having the task and the priority of the task. According to an embodiment of the disclosure, from among the first core 210a, the second core 210b, and the nth core 210c, the processor 210 may identify at least one candidate core 210a, 210b, and/or 210c available for task scheduling, based on the scheduling group of the task and the priority of the task. For example, the processor 210 may select a core for processing the task from among the at least one candidate core 210a, 210b, and/or 210c. Then, the processor 210 may allocate the task to the selected core.

Figure 4:
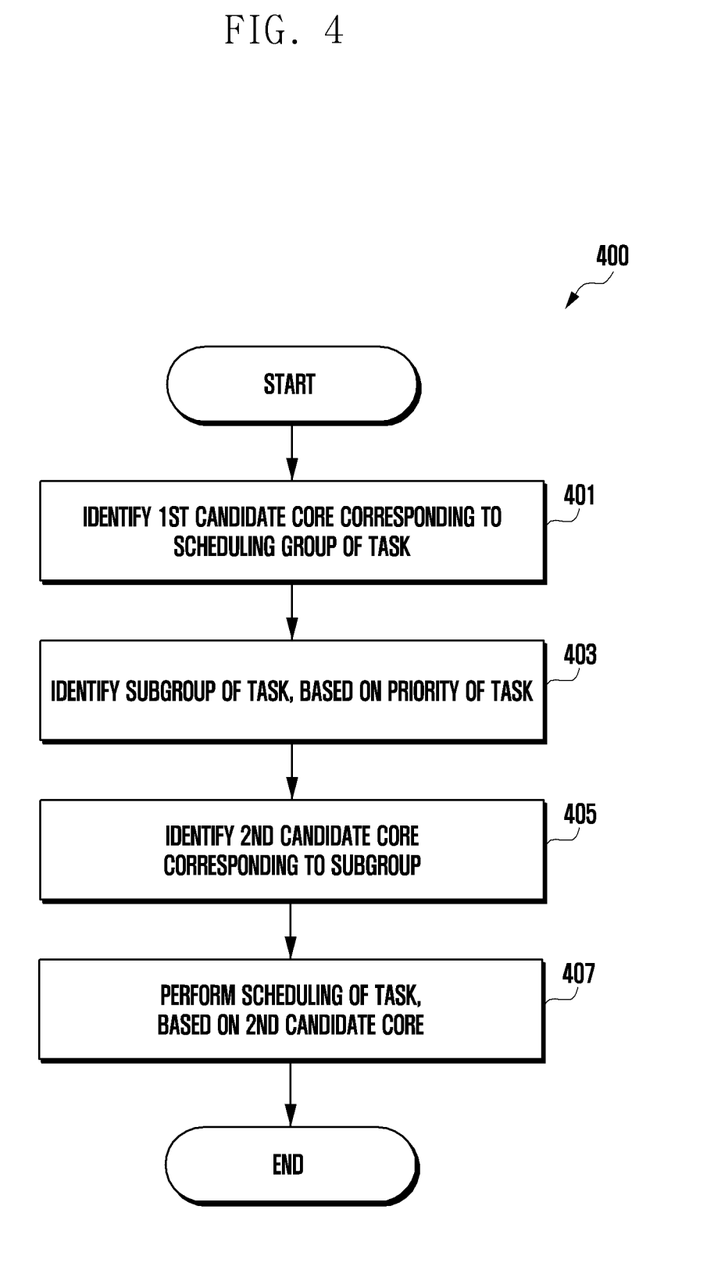
FIG. 4 is a flow diagram illustrating a method for identifying a task-allocable core in an electronic device according to an embodiment of the disclosure.

FIG. 4 is a flow diagram 400 illustrating a method for identifying a task-allocable core in an electronic device according to an embodiment of the disclosure.

According to an embodiment of the disclosure, operations shown in FIG. 4 may be detailed operations of the operation 305 shown in FIG. 3. In the following embodiments of the disclosure, respective operations may be sequentially performed, but not necessarily sequentially. For example, the order of such operations may be changed, and at least two operations may be performed in parallel. For example, the electronic device may be the electronic device 101 shown in FIG. 1 or the electronic device 200 shown in FIG. 2. For example, at least some operations shown in FIG. 4 will be described with reference to FIGS. 5, 6A and 6B.

Figure 5:
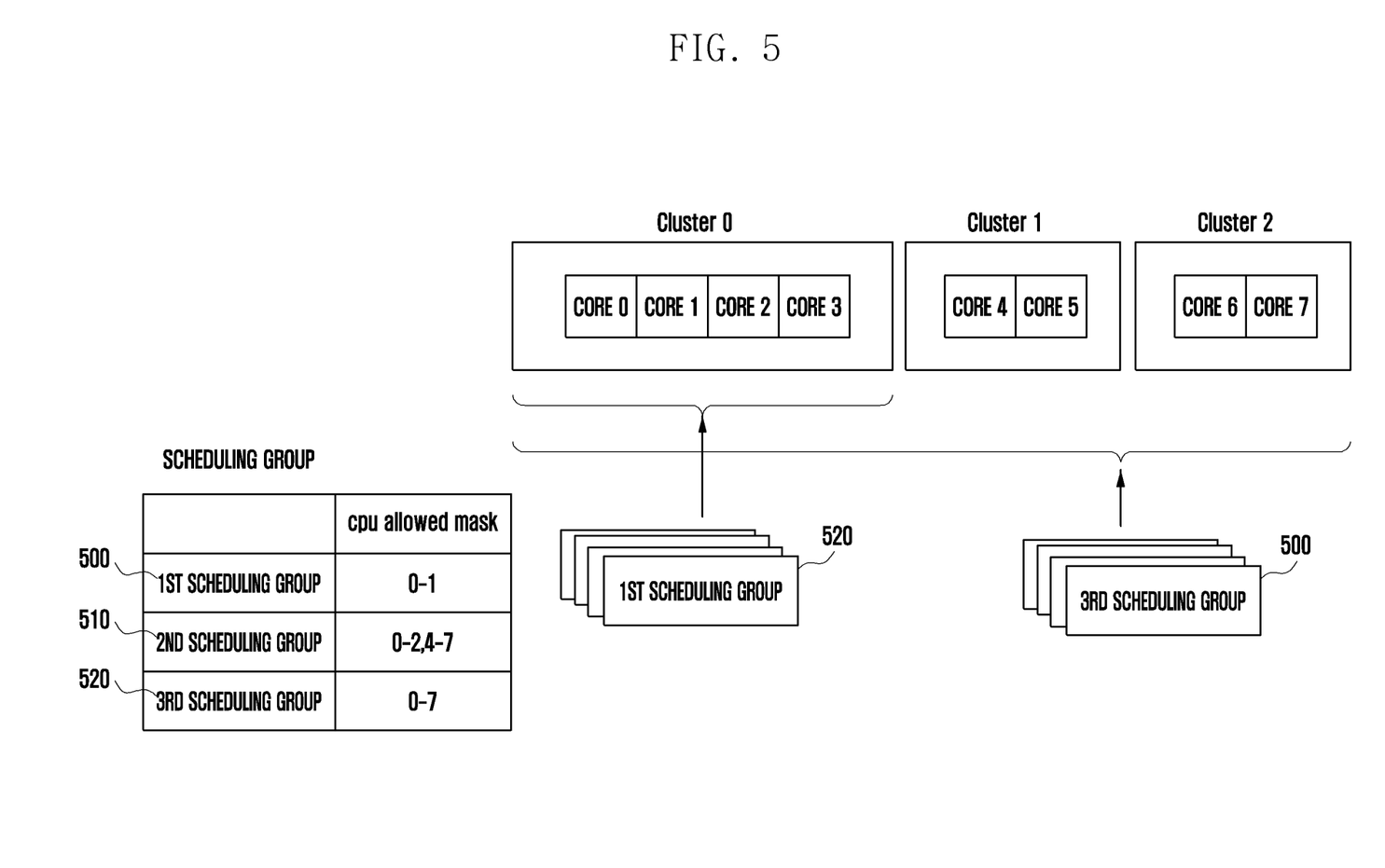
FIG. 5 illustrates allocable cores in a scheduling group according to an embodiment of the disclosure.

FIG. 5 illustrates allocable cores in a scheduling group according to an embodiment of the disclosure.

Figure 6A:
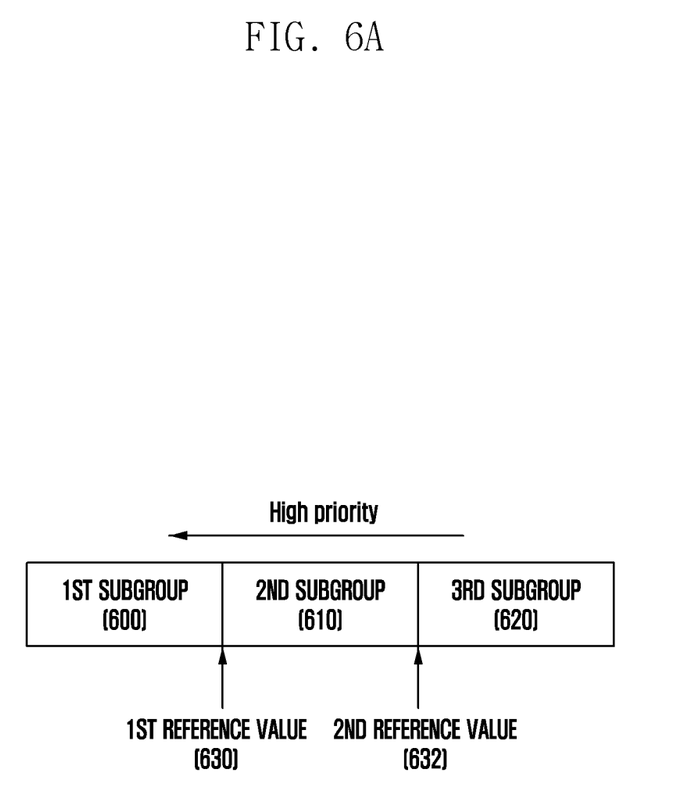
FIGS. 6A and 6B illustrate allocable cores in a subgroup according to various embodiments of the disclosure.
Figure 6B:
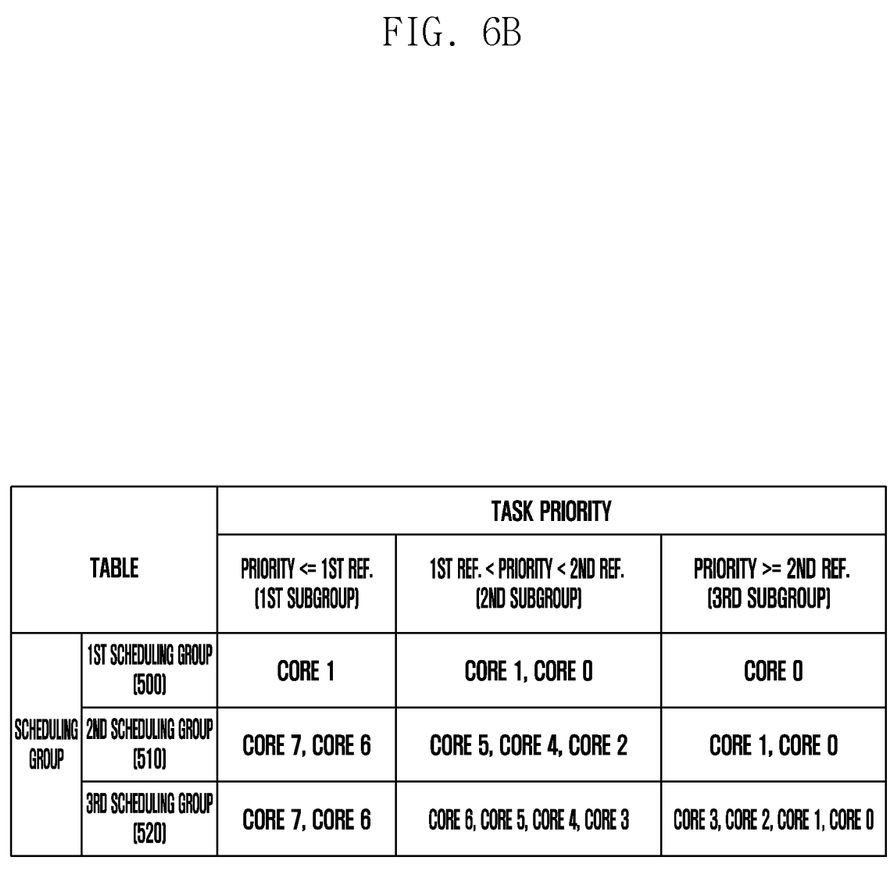

FIGS. 6A and 6B illustrate allocable cores in a subgroup according to various embodiments of the disclosure.

Referring to FIG. 4, according to various embodiments of the disclosure, the electronic device (especially, the processor 120 in FIG. 1 or the processor 210 in FIG. 2) may identify, at operation 401, at least one first candidate core 210a, 210b, and/or 210c, corresponding to a scheduling group of a task to be scheduled, among a plurality of cores (e.g., the first core 210a, the second core 210b, and the nth core 210c) included in the electronic device (e.g., the electronic device 200). For example, the at least one first candidate core may include at least one core available for scheduling the task included in the scheduling group.

Referring to FIG. 5, according to an embodiment of the disclosure, based on configuration information of the scheduling group stored in the memory 220, the processor 210 may identify the at least one first candidate core 210a, 210b, and/or 210c corresponding to the scheduling group in which the task is included. For example, when a task is included in a first scheduling group 500 shown in FIG. 5, the processor 210 may determine cores 0 and 1 among eight cores (i.e., n=8) included in the processor 210 as the first candidate core(s) available for scheduling the task included in the first scheduling group 500. In another example, when a task is included in a second scheduling group 510 shown in FIG. 5, the processor 210 may determine cores 0, 1, 2, 4, 5, 6, and 7 as the first candidate core(s) available for scheduling the task included in the second scheduling group 510. In another example, when a task is included in a third scheduling group 520 shown in FIG. 5, the processor 210 may determine cores 0, 1, 2, 3, 4, 5, 6, and 7 as the first candidate core(s) available for scheduling the task included in the third scheduling group 520.

According to an embodiment of the disclosure, based on active state information of cores and configuration information of the scheduling group stored in the memory 220, the processor 210 may identify the at least one first candidate core 210a, 210b, and/or 210c corresponding to the scheduling group in which the task is included. For example, when a task is included in the first scheduling group 500 shown in FIG. 5, the processor 210 may determine at least one currently active core among cores 0 and 1 allocated to the first scheduling group 500 as the first candidate core(s) available for scheduling the task included in the first scheduling group 500. In another example, when a task is included in the second scheduling group 510 shown in FIG. 5, the processor 210 may determine at least one currently active core among cores 0, 1, 2, 4, 5, 6, and 7 allocated to the second scheduling group 510 as the first candidate core(s) available for scheduling the task included in the second scheduling group 510. In another example, when a task is included in the third scheduling group 520 shown in FIG. 5, the processor 210 may determine at least one currently active core among cores 0, 1, 2, 3, 4, 5, 6, and 7 allocated to the third scheduling group 520 as the first candidate core(s) available for scheduling the task included in the third scheduling group 520.

According to various embodiments of the disclosure, at operation 403, the electronic device (e.g., the processor 120 or 210) may identify a subgroup of the task in the scheduling group (e.g., the third scheduling group 520 in FIG. 5) having the task, based on the priority of the task to be scheduled. According to an embodiment of the disclosure, referring to FIG. 6A, when the priority of a task to be scheduled is equal to or greater than a first reference value 630, the processor 210 may determine that the task is included in a first subgroup 600 of the scheduling group (e.g., the third scheduling group 520 in FIG. 5).

Referring to FIG. 6A, when the priority of a task to be scheduled is smaller than the first reference value 630 and exceeds a second reference value 632, the processor 210 may determine that the task is included in a second subgroup 610 of the scheduling group.

Referring to FIG. 6A, when the priority of a task to be scheduled is equal to or smaller than the second reference value 632, the processor 210 may determine that the task is included in a third subgroup 620 of the scheduling group. The first reference value 630 and/or the second reference value 632 may be fixed or varied. For example, the first reference value 630 and/or the second reference value 632 may be varied depending on at least one of the number of tasks included in each subgroup, the number of waiting tasks for core allocation in each subgroup, the execution state of an application related to the task, or the battery state (e.g., a remaining battery capacity) of the electronic device 200.

According to various embodiments of the disclosure, at operation 405, the electronic device (e.g., the processor 120 or 210) may identify at least one second candidate core 210a, 210b, and/or 210c corresponding to the subgroup of the task from among the at least one first candidate core 210a, 210b, and/or 210c corresponding to the scheduling group of the task. According to an embodiment of the disclosure, based on configuration information of the subgroup stored in the memory 220, the processor 210 may identify the at least one second candidate core 210a, 210b, and/or 210c corresponding to the subgroup in which the task is included. For example, referring to FIG. 6B, when a task is included in the first subgroup 600 of the third scheduling group 520, the processor 210 may determine cores 7 and 6 among eight cores (i.e., n=8) corresponding to the third scheduling group 520 as the second candidate core(s) available for scheduling the task included in the first subgroup 600. Referring to FIG. 6B, when a task is included in the second subgroup 610 of the third scheduling group 520, the processor 210 may determine cores 6, 5, 4, and 3 among eight cores (i.e., n=8) corresponding to the third scheduling group 520 as the second candidate core(s) available for scheduling the task included in the second subgroup 610. For example, core 7 and/or core 6 may have higher processing performance (e.g., a processing speed) than the other cores. For example, at least one core available in each subgroup may be varied depending on a change in at least one reference value for classifying subgroups.

According to various embodiments of the disclosure, at operation 407, the electronic device (e.g., the processor 120 or 210) may perform scheduling of the task, based on the at least one second candidate core corresponding to the subgroup including the task. According to an embodiment of the disclosure, referring to FIG. 6B, when a task is included in the first subgroup 600 of the third scheduling group 520, the processor 210 may allocate the task to any one of the cores 7 and 6, based on a scheduling scheme. For example, when using an energy-aware scheduler (EAS), the processor 210 may predict a load generated by allocating the task to the core 7 or the core 6. For example, based on the load predicted in connection with the task allocation, the processor 210 may allocate the task to a core, among the cores 7 and 6, which consumes less energy when processing the task. In another example, based on the load predicted in connection with the task allocation, the processor 210 may allocate the task to a core, among the cores 7 and 6, having relatively high energy efficiency when processing the task. In another example, the processor 210 may allocate the task to a core, among the cores 7 and 6, having a lower load for processing the task.

According to various embodiments of the disclosure, when there is no candidate core corresponding to the subgroup including the task, the electronic device (e.g., the processor 120 or 210) may perform scheduling of the task, based on a scheduling history of the task to be scheduled. According to an embodiment of the disclosure, when there is no candidate core corresponding to the subgroup including the task, the processor 210 may perform scheduling of the task, based on a previous core of the task to be scheduled. For example, the previous core may include a core to which the task was most recently allocated.

According to various embodiments of the disclosure, the electronic device 200 may manage cores included in the processor 210 by grouping them into clusters. According to an embodiment of the disclosure, as shown in FIG. 5, the electronic device 200 may group cores 0, 1, 2, 3, 4, 5, 6, and 7 into clusters 0, 1, and 2. For example, the cluster 2 may include the cores 6 and 7, which provide a relatively high processing speed and consume large amounts of power. For example, the cluster 1 may include the cores 4 and 5, which have a processing speed lower than the cluster 2 but higher than the cluster 0 and have power consumption lower than the cluster 2 but higher than the cluster 0. For example, the cluster 0 may include the cores 0, 1, 2, and 3, which have a relatively low processing speed and high power efficiency. For example, at least one core included in the cluster 0, the cluster 1, and/or the cluster 2 may be used independently or together. For example, the electronic device 200 may use only the core of any one of the clusters 0, 1, and 2. In another example, the electronic device 200 may simultaneously use cores of a plurality of clusters among the cluster 0, 1, and 2.

Figure 7:
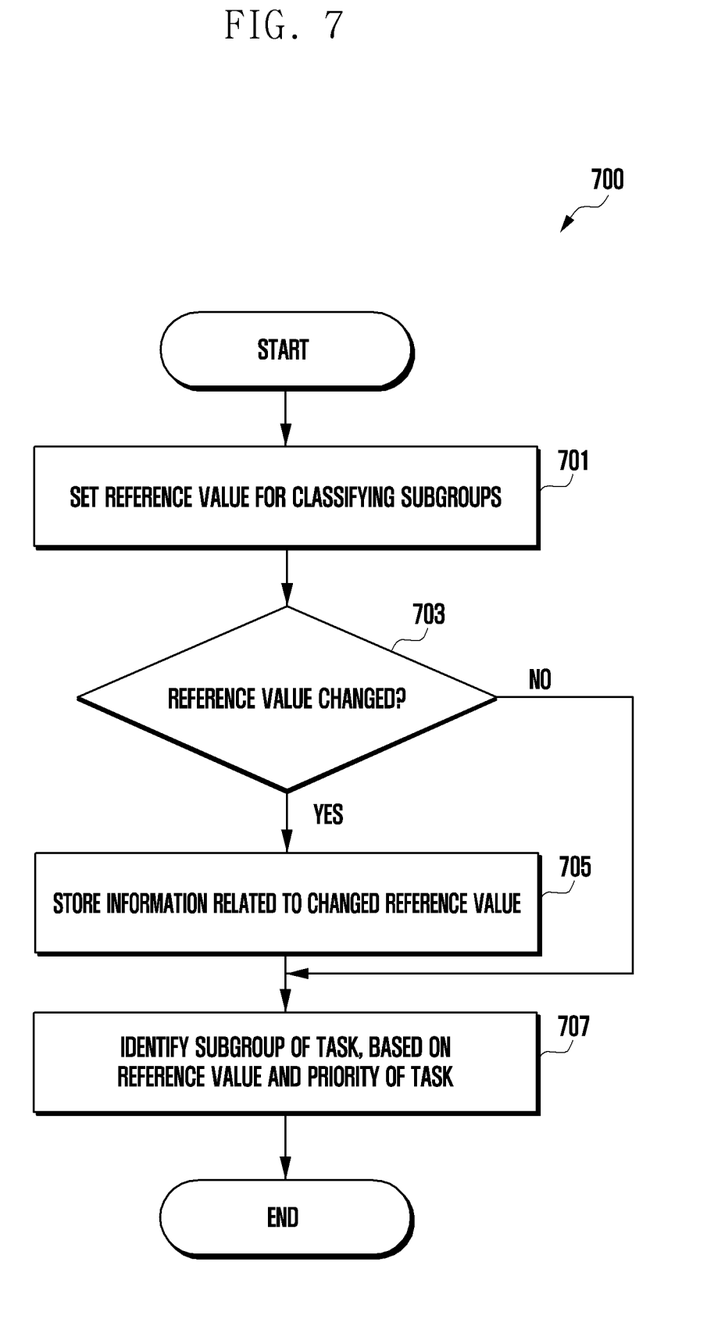
FIG. 7 is a flow diagram illustrating a method for setting a subgroup in an electronic device according to an embodiment of the disclosure.

FIG. 7 is a flow diagram 700 illustrating a method for setting a subgroup in an electronic device according to an embodiment of the disclosure.

According to an embodiment of the disclosure, operations shown in FIG. 7 may be detailed operations of the operation 403 shown in FIG. 4. In the following embodiments of the disclosure, respective operations may be sequentially performed, but not necessarily sequentially. For example, the order of such operations may be changed, and at least two operations may be performed in parallel. For example, the electronic device may be the electronic device 101 shown in FIG. 1 or the electronic device 200 shown in FIG. 2.

Referring to FIG. 7, according to various embodiments of the disclosure, the electronic device (especially, the processor 120 in FIG. 1 or the processor 210 in FIG. 2) may set, at operation 701, at least one reference value for classifying subgroups of a scheduling group including a task to be scheduled. According to an embodiment of the disclosure, the at least one reference value may be set (or updated) based on at least one of the number of tasks included in each subgroup, the number of waiting tasks for core allocation in each subgroup, the execution state of an application related to the task, or the battery state (e.g., remaining battery capacity) of the electronic device 200. For example, the number of tasks included in each subgroup may include the maximum number of tasks included in each subgroup of the scheduling group, or an average of the number of tasks included in the subgroups. For example, the number of waiting tasks in each subgroup may include the maximum number of waiting tasks included in each subgroup of the scheduling group, or an average of the number of waiting tasks included in the subgroups.

According to various embodiments of the disclosure, at operation 703, the electronic device (e.g., the processor 120 or 210) may determine whether the at least one reference value for classifying subgroups is changed. According to an embodiment of the disclosure, the processor 210 may determine whether the at least one reference value set at the operation 701 is different from a reference value stored in a memory (e.g., the memory 220).

According to various embodiments of the disclosure, when the at least one reference value for classifying subgroups is changed (i.e., 'Yes' branch of the operation 703), the electronic device (e.g., the processor 120 or 210) may store, at operation 705, information related to the changed at least one reference value in the memory 220.

According to various embodiments of the disclosure, when the at least one reference value for classifying subgroups is not changed (i.e., 'No' branch of the operation 703), or after the information related to the changed at least one reference value is stored at the operation 705, the electronic device (e.g., the processor 120 or 210) may identify, at operation 707, a subgroup including the task by comparing the at least one reference value for classifying subgroups with the priority of the task.

According to various embodiments of the disclosure, a method of operating an electronic device may include identifying, when a task to be scheduled occurs, a scheduling group having the task among a plurality of predefined scheduling groups; and performing scheduling for the task in a processor including a plurality of heterogeneous cores, based on the identified scheduling group having the task and a priority of the task.

The scheduling group having the task may be identified, based on at least one of an execution state of an application program related to the task, an importance of the task, or a type of the task.

The performing of the scheduling may include identifying, based on a priority of the task, a subgroup having the task among a plurality of subgroups included in the scheduling group having the task; identifying one or more cores available in the subgroup having the task among the plurality of heterogeneous cores; and allocating the task to one of the one or more cores.

The identifying of the subgroup may include identifying at least one reference value for classifying the plurality of subgroups; and identifying the subgroup having the task, based on the at least one reference value.

The at least one reference value may be set, based on at least one of a number of tasks included in each subgroup, a number of waiting tasks for core allocation in each subgroup, an execution state of an application related to a task, or a battery state of an electronic device.

The number of tasks included in each subgroup may include a maximum number of tasks included in each subgroup of the scheduling group having the task, or an average of the number of tasks included in the plurality of subgroups, and the number of waiting tasks in each subgroup may include a maximum number of waiting tasks included in each subgroup of the scheduling group having the task, or an average of the number of waiting tasks included in the plurality of subgroups.

The identifying of the one or more cores may include identifying one or more candidate cores available in the scheduling group having the task among the plurality of heterogeneous cores; and identifying the one or more cores available in the subgroup having the task among the one or more candidate cores.

The allocating of the task may include allocating the task to one of the one or more cores, based on at least one of an amount of energy required to process the task in each of the one or more cores, an efficiency of the energy, or a load of each core.

The method may further include when there is no core available in the subgroup having the task, performing scheduling for the task, based on a scheduling history of the task.

The priority of the task may be set during a programming process of an application program related to the task or set based on a type of the task.

According to various embodiments of the disclosure, the electronic device including a heterogeneous multi-processor performs scheduling to process a task determined to be relatively important in a relatively high-performance core and to process a task to be relatively unimportant in a relatively low-performance core, based on a scheduling group including such a task and/or a priority of such a task. This may improve data processing performance while reducing energy consumption caused by task processing of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory; and
a processor operatively connected to the memory and including a plurality of heterogeneous cores, wherein the processor is configured to:
identify, when a task to be scheduled occurs, a scheduling group having the task among a plurality of predefined scheduling groups, and
perform scheduling for the task, based on the identified scheduling group having the task and a priority of the task, by:
identifying, based on the priority of the task and at least one reference value for classifying a plurality of subgroups, a subgroup having the task among the plurality of subgroups included in the scheduling group having the task,
identifying one or more cores available in the subgroup having the task among the plurality of heterogeneous cores, and
allocating the task to one of the one or more cores,
wherein the at least one reference value is set based on at least one of a number of tasks included in each subgroup, a number of waiting tasks for core allocation in each subgroup, an execution state of an application related to a task, or a battery state of the electronic device.

2. The electronic device of claim 1, wherein the processor is further configured to:
identify the scheduling group having the task, based on at least one of an execution state of an application program related to the task, an importance of the task, or a type of the task.

3. The electronic device of claim 1, wherein the processor is further configured to:
identify one or more candidate cores available in the scheduling group having the task among the plurality of heterogeneous cores, and
identify the one or more cores available in the subgroup having the task among the one or more candidate cores.

4. The electronic device of claim 1,
wherein the number of tasks included in each subgroup includes a maximum number of tasks included in each subgroup of the scheduling group having the task, or an average of the number of tasks included in the plurality of subgroups, and
wherein the number of waiting tasks in each subgroup includes a maximum number of waiting tasks included in each subgroup of the scheduling group having the task, or an average of the number of waiting tasks included in the plurality of subgroups.

5. The electronic device of claim 1, wherein the processor is further configured to:
allocate the task to one of the one or more cores, based on at least one of an amount of energy required to process the task in each of the one or more cores, an efficiency of the energy, or a load of each core.

6. The electronic device of claim 1, wherein the processor is further configured to:
perform the scheduling for the task through a core selected from among the plurality of heterogeneous cores.

7. The electronic device of claim 6, wherein the core is selected based on at least one of an execution state of each core, a load of each core, a processing performance of each core, or a battery state of the electronic device.

8. A method of operating an electronic device, the method comprising:
identifying, when a task to be scheduled occurs, a scheduling group having the task among a plurality of predefined scheduling groups; and
performing scheduling for the task in a processor including a plurality of heterogeneous cores, based on the identified scheduling group having the task and a priority of the task, by:
identifying, based on the priority of the task and at least one reference value for classifying a plurality of subgroups, a subgroup having the task among the plurality of subgroups included in the scheduling group having the task,
identifying one or more cores available in the subgroup having the task among the plurality of heterogeneous cores, and
allocating the task to one of the one or more cores,
wherein the at least one reference value is set based on at least one of a number of tasks included in each subgroup, a number of waiting tasks for core allocation in each subgroup, an execution state of an application related to a task, or a battery state of the electronic device.

9. The method of claim 8, wherein the scheduling group having the task is identified, based on at least one of an execution state of an application program related to the task, an importance of the task, or a type of the task.

10. The method of claim 8,
wherein the number of tasks included in each subgroup includes a maximum number of tasks included in each subgroup of the scheduling group having the task, or an average of the number of tasks included in the plurality of subgroups, and
wherein the number of waiting tasks in each subgroup includes a maximum number of waiting tasks included in each subgroup of the scheduling group having the task, or an average of the number of waiting tasks included in the plurality of subgroups.

11. The method of claim 8, wherein the identifying of the one or more cores comprises:
identifying one or more candidate cores available in the scheduling group having the task among the plurality of heterogeneous cores; and
identifying the one or more cores available in the subgroup having the task among the one or more candidate cores.

12. The method of claim 8, wherein the allocating of the task comprises:
allocating the task to one of the one or more cores, based on at least one of an amount of energy required to process the task in each of the one or more cores, an efficiency of the energy, or a load of each core.

13. The method of claim 8, further comprising:
when there is no core available in the subgroup having the task, performing scheduling for the task, based on a scheduling history of the task.

14. The method of claim 8, wherein the priority of the task is set during a programming process of an application program related to the task or set based on a type of the task.

* * * * *